(12) United States Patent
Caldwell et al.

(10) Patent No.: US 6,447,740 B1
(45) Date of Patent: Sep. 10, 2002

(54) MERCURY REMOVAL FROM FLUE GAS

(75) Inventors: Douglas Caldwell, Vancouver; John W. Biggar, Burnaby; Brian W. McIntyre, Vancouver, all of (CA)

(73) Assignee: ISCA Management Ltd., Vancouver (CA)

( * ) Notice: Subject to any disclaimer, the term of this patent is extended or adjusted under 35 U.S.C. 154(b) by 0 days.

(21) Appl. No.: 09/674,032

(22) PCT Filed: May 3, 1999

(86) PCT No.: PCT/CA99/00403

§ 371 (c)(1),
(2), (4) Date: Oct. 25, 2000

(87) PCT Pub. No.: WO99/58228

PCT Pub. Date: Nov. 18, 1999

Related U.S. Application Data

(60) Provisional application No. 60/084,762, filed on May 8, 1998.

(51) Int. Cl.$^7$ .......................... B01D 53/50; B01D 53/52; B01D 53/56; B01D 53/64
(52) U.S. Cl. ...................... 423/210; 423/103; 423/220; 423/235; 423/242.1; 423/243.01; 423/243.02
(58) Field of Search ................................ 423/103, 210, 423/235, 242.1, 243.01, 243.02, 220

(56) References Cited

U.S. PATENT DOCUMENTS

| | | | | |
|---|---|---|---|---|
| 3,838,190 A | * | 9/1974 | Birke et al. ................. | 423/210 |
| 3,849,267 A | * | 11/1974 | Hilgen et al. ................. | 204/99 |
| 4,619,608 A | | 10/1986 | McIntyre et al. ........... | 423/220 |
| 5,226,545 A | * | 7/1993 | Foust ............................ | 209/3 |

FOREIGN PATENT DOCUMENTS

| | | | | |
|---|---|---|---|---|
| DE | 41 23 258 A1 | * | 1/1993 | ................. 423/210 |
| DE | 4422661 A1 | | 1/1996 | |
| EP | 0208036 A1 | | 1/1987 | |
| GB | 1121845 | * | 7/1968 | |
| WO | WO98/16301 | | 4/1998 | |

* cited by examiner

*Primary Examiner*—Stanley S. Silverman
*Assistant Examiner*—Timothy C. Vanoy
(74) *Attorney, Agent, or Firm*—Oyen Wiggs Green & Mutala

(57) ABSTRACT

The invention is directed to a process for oxidizing gaseous pollutants in a flue gas stream composed of flue gases, water vapour and one or more gaseous pollutants selected from the group consisting of $SO_2$, $NO$, $NO_2$, $H_2S$, and mercury vapour, the oxidized form of the pollutants being more readily removable from the flue gas stream by water absorption than the non-oxidized form thereof, comprising: (a) injecting sufficient chlorine in a gaseous form, a liquid form, or as a chlorine water solution, into the flue gas stream while the flue gas stream is at a temperature greater than 100° C. to thereby react the chlorine with the pollutants and permitting the flue gas stream/chlorine mixture to react for a sufficient time to enable a significant amount of oxidation of the pollutants to occur, whereby an oxidized flue gas, stream comprising flue gases, water vapour and oxidized gaseous pollutants is formed; (b) scrubbing the oxidized flue gas stream with water, or water solution of pH less than or equal to 7; and (c) adding sufficient alkali metal iodide salt to the water to precipitate the mercury from the water or water solution of pH less than or equal to 7.

3 Claims, No Drawings

MERCURY REMOVAL FROM FLUE GAS

Convention priority for this application under 35 U.S.C. 119(e) is claimed based on U.S. provisional patent application Ser. No. 60/084,762, filed May 8, 1998.

FIELD OF THE INVENTION

The present invention relates to simultaneous oxidation of $SO_2$ to sulphuric acid, $NO_x$ to nitric acid, and metallic mercury vapour to a mercury chloride, in a flue gas, thereby allowing capture of mercury in the downstream process solutions.

BACKGROUND OF THE INVENTION

U.S. Pat. No. 4,619,608, granted Oct. 28, 1986, describes the effects of sulphur dioxide and nitrogen oxides released from the burning of fossil fuel.

Regulations in force since 1985 have mandated two stages of cleanup for the flue gases emitted from fossil fuel powered utility power stations. A December, 1996 proposal by the U.S. Environmental Protection Agency (EPA) has proposed even higher control levels based on health concerns.

In addition, mercury has now become a pollutant of concern. Costs of capturing mercury can run as high as $100,000 per pound using activated carbon or limestone systems. A problem with the limestone systems is the re-release of the mercury once captured.

In February, 1998, the EPA released a mercury report to U.S. Congress which identified the health concerns and the need to develop new technologies to capture mercury from the vapour emitted from coal fired power plants.

SUMMARY OF THE INVENTION

U.S. Pat. No. 4,619,608 describes a process for injecting chlorine to oxidize $SO_2$ and $NO_x$ components of a flue gas stream, and removing them from the flue gas.

This invention is an improvement on that process and adds the capacity of trapping metallic mercury in a form that avoids the potential for re-release of the mercury. Costs to operate any system are a concern, and the process herein described is more economical than existing technology. The innovation is in the combination of the capture of all three pollutants of concern, namely $SO_2$, $NO_x$ and Hg vapour, in one single economical process.

The invention is directed to a process for oxidizing gaseous pollutants in a flue gas stream composed of flue gases, water vapour and one or more gaseous pollutants selected from the group consisting of $SO_2$, NO, $NO_2$, $H_2S$, and mercury vapour, said oxidized form of the pollutants being more readily removable from the flue gas stream by water absorption than the non-oxidized form thereof, comprising: (a) injecting sufficient chlorine in a gaseous form, a liquid form, or as a chlorine water solution, into the flue gas stream while the flue gas stream is at a temperature greater than 100° C. to thereby react the chlorine with the pollutants and permitting the flue gas stream/chlorine mixture to react for a sufficient time to enable a significant amount of oxidation of the pollutants to occur, whereby an oxidized flue gas stream comprising flue gases, water vapour and one or more gaseous oxidized said pollutants is formed; (b) scrubbing the oxidized flue gas stream with water, or water solution, of pH less than or equal to 7; and (c) adding sufficient alkali metal iodide salt to precipitate mercuric iodide from the water or water solution of pH less than or equal to 7, as the concentration level requires. The alkali metal iodide salt can be potassium iodide.

DETAILED DESCRIPTION OF THE INVENTION

Chlorine is injected in a gaseous, liquid or solution form into a hot gas stream of a temperature greater than 100° C. for the purpose of oxidizing objectionable components in the gas stream, such as, but not restricted to $SO_2$, $NO_x$, and mercury vapour, when the oxidized form of the gases is more readily removed from the gas stream. After sufficient reaction time, the gas stream mixture passes through water scrubbers for the further removal of the objectionable components from the gas stream. Acidic and basic compounds of the gas stream and halogens, including excess chlorine, are also removed in the scrubbers. The pollutants remain as the corresponding oxidized acids or salts in the process effluent solution. The mercury is precipitated from the process solution.

Chlorine can be used to remove mercury from gases, as described by British Patent No. 1,121,845, and U.S. Pat. No. 3,849,267. In these cases, the mercury is converted to mercuric chloride that is captured in solution. The subject matter of these two patents is incorporated herein by reference.

The "Mechanism and Kinetics of Mercury Oxidation", by Chlorine-Containing Solutions" (V. A. Skripnik et al.—J. Appl. Chem. USSR, 52, 1169 (1979)—Plenum Publishing) clearly demonstrates that the oxidation of the mercury with chlorine occurs in the gas phase. In investigating the process of purifying a gas from mercury with chlorine water, they found that sweeping out of chlorine from the water takes place simultaneously with the removal of mercury from the gas. Practically all of the chlorine (90%) is swept into the gas phase, where the oxidation of mercury also takes place. The higher the chlorine concentration of the arriving water and the higher its circulation rate, that is, the greater the amount of chlorine swept out, the less is the metallic mercury content of the purified gas.

The process of purifying the gas from mercury with an acidic chlorine-containing solution can be represented by two mechanisms:

(1) Chlorine from the solution is evacuated into the gas space and reacts with the mercury;

(2) Mercury diffuses from the gas phase into the solution and reacts with the chlorine.

Each of these mechanisms consists of individual stages, and has limiting stages which determine the rate of the given mechanism and of the entire process as a whole. The studies performed showed that practically all the chlorine is swept out of the solution into the gas phase, and this process takes place at a high rate. This means that purification of the gas from mercury takes place principally by the first mechanism, that is, in the gas phase, with subsequent absorption of the reaction products by the solution. This process includes the following stages: difflusion of chlorine in the solution, sweeping out of the chlorine from the solution into the gas space, diffusion of chlorine and mercury in the gas phase, reaction of chlorine with the mercury, and extraction of the reaction products into the solution. The chlorine-containing solution is more reactive with respect to mercury in acid medium than in alkaline medium.

Recent work by Argonne Laboratories and others has confirmed that the use of chlorine is the most effective way to capture mercury that is in the metallic form (Feely, Thomas J. III, "An Overview of the U.S. Department of Energy's Electric Utility Mercury Emissions R&D Activities" Acid Rain and the Electric Utilities II Conference, Jan. 21–22, 1997, Scottsdale, Ariz.).

Much current attention has been focused on mercury, due primarily to its ability to persist in the environment and to bioaccumulate, in the form of methyl mercury, in the food chain. Mercury has been shown to be present in flue gas produced by coal combustion, but at extremely low concentrations, on the order of parts per billion. This, coupled with the fact that mercury can be associated with very fine particles or can exist as a vapour in coal-fired power systems, makes it difficult to remove by conventional pollution control equipment. To further complicate matters, the chemical form (or oxidation state) of mercury not only impacts its collection or removal but also its transport and subsequent deposition once released to the atmosphere. It is known that coal-combustion mercury exists as a vapour in both the elemental ($Hg^\circ$) and ionic or oxidized ($Hg++$) form. Therefore, in addition to determining the split of mercury between the solid and gaseous phase, it is also necessary to measure its state of oxidation. The results of characterization studies indicate that gaseous-state mercury predominates in most coal-fired boiler flue gases. Typically, greater than 90% of the mercury is collected as a vapour. The subject matter of this article is also incorporated herein by reference.

In the case of the subject invention, the use of chlorine to oxidize $SO_x$ and $NO_x$ in a flue gas also results in the conversion of the metallic mercury to mercuric chloride. This mercuric chloride is captured in the sulphuric acid solution that results from the conversion of $SO_2$ to $H_2SO_4$.

Using a small holding tank, the mercury is precipitated out according to the following reaction steps:

(i) $2KI + 2H_2SO_4 + O_2 \rightarrow 2KSO_4 + I_2 + 2H_2O$ (ii) $I_2 + I^- \rightarrow I_3^-$ (iii) $Hg^{2+} + 2I_3^- \rightarrow HgI_2 + 2I_2$ Plate and frame filter presses, or other methods, can then be used to remove the filter cake.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for oxidizing gaseous pollutants in a flue gas stream composed of flue gases, water vapour and one or more gaseous pollutants selected from the group consisting of $SO_2$, NO, $NO_2$, $H_2S$, and mercury vapour, said oxidized form of the pollutants being more readily removable from the flue gas stream by water absorption than the non-oxidized form thereof, comprising:

(a) injecting sufficient chlorine in a gaseous form, a liquid form, or as a chlorine water solution, into the flue gas stream while the flue gas stream is at a temperature greater than 100° C. to thereby react the chlorine with the pollutants to form an oxidized flue gas stream comprising flue gases, water vapour and oxidized gaseous pollutants is formed;

(b) scrubbing the oxidized flue gas stream with water, or water solution of pH less than or equal to 7; and (c) adding sufficient alkali metal iodide salt to the water or water solution to precipitate the mercury from the water or water solution of pH less than or equal to 7.

2. A process as claimed in claim 1 wherein the alkali metal iodide salt is potassium iodide.

3. A process for oxidizing gaseous pollutants in a flue gas stream composed of flue gases, water vapour and one or more gaseous pollutants selected from the group consisting of $SO_2$, NO, $NO_2$ and $H_2S$, and mercury vapour, comprising:

(a) injecting sufficient chlorine into the flue gas stream while the flue gas stream is at a temperature greater than 100° C. to thereby oxidize the pollutants to produce a flue gas stream comprising flue gases, water vapour and oxidized gaseous pollutants;

(b) scrubbing the flue gas stream with water, or water solution of pH less than or equal to 7; and (c) adding sufficient alkali metal iodide salt to the water or water solution to precipitate mercury from the water or water solution of pH less than or equal to 7.

* * * * *